United States Patent [19]

Angerer et al.

[11] 4,409,301

[45] Oct. 11, 1983

[54] BIFUNCTIONAL GAS DIFFUSION ELECTRODE

[75] Inventors: Herman F. Angerer, Biel-Benken; Nenad R. Tomov, Geneva, both of Switzerland

[73] Assignee: Diamond Shamrock Corporation, Dallas, Tex.

[21] Appl. No.: 332,519

[22] Filed: Dec. 21, 1981

[51] Int. Cl.³ .............................................. H01M 4/00
[52] U.S. Cl. ........................................ 429/27; 429/40
[58] Field of Search ............................... 429/27, 40–45

[56] References Cited

U.S. PATENT DOCUMENTS 4,333,993  6/1982  Gibbard ................................ 429/27
4,341,848  7/1982  Lui et al. ............................... 429/27

Primary Examiner—Charles F. Lefevour
Attorney, Agent, or Firm—Bruce E. Harang

[57] ABSTRACT

A bifunctional gas-diffusion electrode operative alternately for gas consumption and gas evolution comprises a gas-side layer in which gas consumption takes place, an electrolyte-side layer where gas evolution takes place and an intermediate rectifying layer of semi-conducting material arranged between the gas-side layer and the electrolyte-side layer so as to prevent unwanted gas evolution in the gas-side layer. The rectifying layer may be a p-n junction or may form part of a Schottky barrier junction.

11 Claims, 3 Drawing Figures

BIFUNCTIONAL GAS DIFFUSION ELECTRODE

TECHNICAL FIELD

The invention relates to bifunctional gas diffusion electrodes operative alternately for gas consumption and gas evolution, and to secondary metal-gas batteries incorporating such electrodes.

BACKGROUND ART

By gas diffusion electrode is understood a porous catalytic electrode in which a gas reactant and an aqueous electrolyte are brought into contact to react electrochemically. Gas diffusion electrodes are used extensively in electrochemical power sources such as metal-air and metal-hydrogen batteries or fuel cells. In all of these, the gas diffusion electrode is on one side in contact with an electrolyte and on the other side in contact with a gas. In the metal-air battery, the gas is air.

Attempts have already been made to provide gas diffusion electrodes which operate alternately for gas consumption and gas evolution. These electrodes, which combine cathodic and anodic functions, are known as bifunctional gas diffusion electrodes. A typical application of these bifunctional electrodes is in secondary metal-gas batteries such as iron-air, zinc-air and nickel-hydrogen batteries which consume gas during discharge and evolve gas during electrical recharging.

German Patent application No. DT 19 21 157 describes a rechargeable metal-air battery with a bifunctional gas diffusion electrode comprising two electrode layers bonded to each other: a hydrophilic electrolyte-side layer made of porous nickel and a hydrophobic gas-side layer made of carbon, a PTFE binder and preferably impregnated with an oxygen-reducing catalyst. The hydrophilic porous nickel layer has a dual function, as a current collector and as an active layer for oxygen evolution during charge. The gas-side hydrophobic layer is an active area of the electrode during the gas consumption phase or discharge cycle of the battery. Thus, the two active zones of the electrode during charge and discharge were theoretically kept apart, but some unwanted oxygen evolution took place in the hydrophobic gas-side layer during charge and, despite attempts to prevent this by an increase of pressure on the gas-side of the electrode, was the cause of corrosion, deactivation of the catalyst and a reduced lifetime.

Efforts to improve these bifunctional electrodes, in particular to obtain an acceptable lifetime, have not been successful to date with the result that metal-gas batteries still have a relatively limited use.

DISCLOSURE OF INVENTION

The invention is directed to novel composite bifunctional gas diffusion electrodes and to secondary metal-gas batteries incorporating such electrodes, as set out in the claims, in which the problem of unwanted gas evolution in the gas-side layer is greatly reduced by providing an intermediate rectifying layer of semi-conducting material. This semiconducting layer may be a p-n junction diode or may contact a layer of metal to form a Shottky barrier junction. This rectifier is always arranged in such a way that the gas-side layer is practically electrically inactive during the gas-evolution phase which corresponds to the charging cycle of the battery, so that substantially no undesired gas evolution can take place in this layer. Electron flow into or out of the gas-side layer of the electrode is thus allowed freely during the gas consumption phase which corresponds to discharge of the battery, but is strongly inhibited during charging.

The arrangement of the rectifying layer to provide the desired direction of electron flow depends on the nature of the gas reactant used, i.e. whether the gas is reduced or is oxidized during the consumption phase. When the supplied gas is reduced, electrons must be able to flow into the gas-side layer and when the supplied gas is oxidized, electrons must be able to flow out of the gas-side layer. To illustrate this, in the case of a p-n junction used in a metal-air battery (i.e. where gas reduction takes place), the p-type conducting zone will face the gas-side layer and the n-type conducting zone will face the electrolyte-side layer. Conversely, in the case of gas oxidation (as in metal-hydrogen batteries), the relative position of the two zones will be reversed, the n-type semi-conducting zone facing the gas-side and the p-type semi-conducting zone facing the electrolyte-side of the bifunctional electrode.

In one embodiment of the invention, the rectifying semi-conducting layer is a porous electrolyte permeable layer formed, for example, of appropriately doped materials such as Te, SbBi, Sb, Si, GeTe, Ge, Bi, InAs, InSb, $CdSnAs_2$, GaSb and $Bi_2Te_3$.

In a preferred embodiment, the current collection means is a foraminate metal current collector of sandwich construction in which the semi-conducting layer is encapsulated, and hence protected from the electrolyte. For example, the semi-conducting layer is sandwiched between two foraminous sheets of nickel foil. The outer part of this current collector can constitute the gas-evolving part of the electrolyte-side layer of the bifunctional electrode.

It is desirable but not essential for the rectifying layer to occupy the entire surface of the electrode. Conveniently, and especially for large electrode, an array of small rectifying layers can be placed between the gas-side layer and the electrolyte-side layer.

Although the invention is described with specific reference to use of the electrodes in batteries, especially metal-gas batteries, the bifunctional gas-diffusion electrode of the invention is useful in other systems involving alternate gas evolution and consumption, for example as oxygen cathodes in chlor-alkali electrolysis where gas evolution within the gas-diffusion electrode structure must be avoided. Such unwanted gas evolution can happen when the cells are short-circuited for maintenance.

BEST MODES FOR CARRYING OUT THE INVENTION

Figure 1:
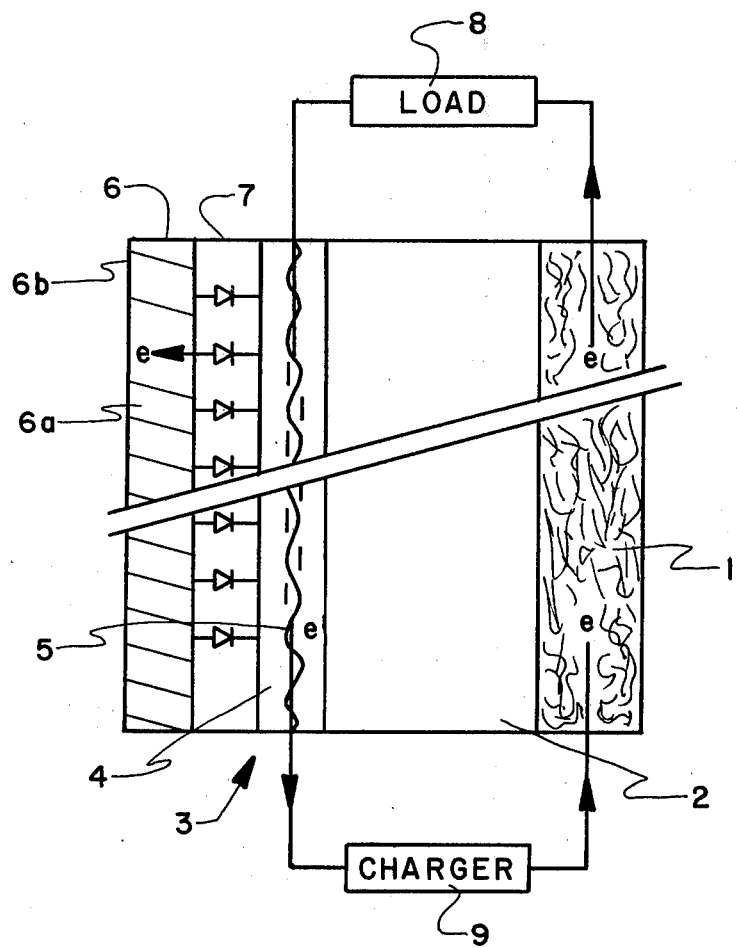
FIG. 1 is a schematic cross-section of one metal-gas battery module with a bifunctional gas diffusion electrode according to this invention.

As shown in FIG. 1, a metal-gas battery comprises a metal electrode 1, using iron, zinc, cadmium or nickel oxide as active material; an electrolyte compartment 2, containing an alkali hydroxide electrolyte, preferably KOH; and a bifunctional gas diffusion electrode 3. The bifunctional electrode 3 of the present invention comprises a porous carbon hydrophilic electrolyte-side layer 4 and a hydrophobic gas side-layer 6, separated by a porous semi-conducting layer 7. The hydrophilic porous electolyte-side layer 4 contains a pressed-in current collector 5, preferable a foraminous nickel plate or mesh. The hydrophobic gas-side layer 6 has a catalytically-active gas reaction zone 6a made of pressed carbon particles impregnated with silver, platinum or another catalyst and a binder preferably PTFE, and a hydrophobic backing 6b directly exposed to a reacting gas, e.g. air-oxygen. The part of zone 6a adjacent the semi-conducting layer 7 is sufficiently hydrophilic to be impregnated with electrolyte penetrating via layer 7 to set up a 3-phase reaction boundary within the reaction zone 6a.

The semi-conducting layer 7 is made of a semi-conductor such as germanium or silicon, doped by conventional techniques to provide a p-n junction diode. As shown, this diode is arranged to allow electron flow from layer 4 to layer 6 but not in the reverse direction. For example, the layer 7 consists of a wafer of n-type germanium doped with indium to form a p-type conducting zone on its face adjacent the gas-side layer 6. The forward voltage bias or conduction of the layer is preferably no greater than about 0.1 V.

Multiples of the module shown in FIG. 1 constitute a metal-gas battery of any desired capacity.

The battery is charged by an external charger 9 and discharged via external load 8. To charge the battery a potential difference is applied between the metal electrode 1 and current collector 5 by means of charger 9 so that electrons flow from electrolyte-side layer 4 of the gas diffusion electrode through the charger 9 to metal electrode 1. During charging, gas evolution takes place on the electrolyte-side 4 of the gas diffusion electrode which acts as anode; however, virtually no gas evolution can take place within the gas-side layer 6 because of the rectifying effect of the semi-conducting layer 7. Conversely, when discharging the battery, electrons flow from the metal electrode 1 through the load 8 and current collector 5 and through the semi-conductor layer 7 into the gas side 6 of the bifunctional electrode where a reduction reaction with a supplied gas takes place in zone 6a.

To minimize the forward bias voltage of the rectifying semi-conducting layer 7, the battery may conveniently be operated above room temperature.

Figure 2:
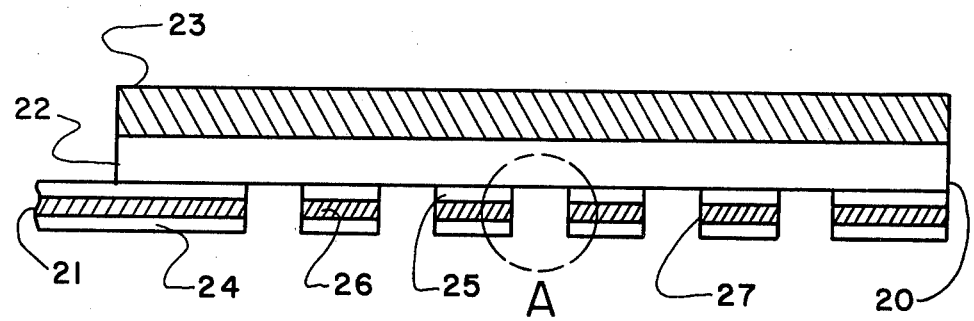
FIG. 2 is a schematic cross-section of another bifunctional gas diffusion electrode with a composite current collector of the present invention.
Figure 2A:
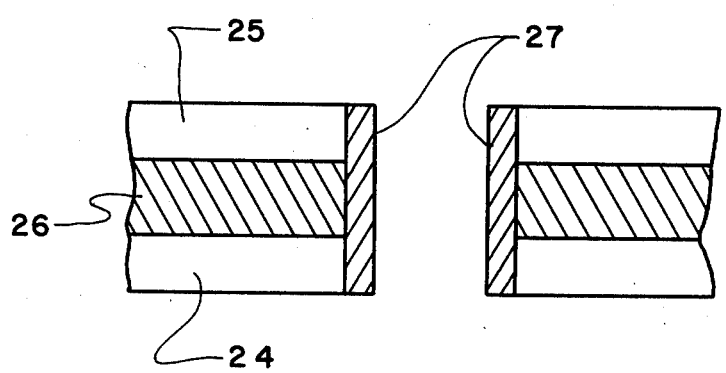
FIG. 2A shows a detail of the composite current collector of FIG. 2.

FIG. 2 shows a bifunctional electrode 20 comprising a composite current collector 21, a gas-side layer 22, e.g. of porous carbon impregnated with a catalyst, and a hydrophobic backing layer 23. The current collector 21 comprises two foraminous sheets 24, 25 of corrrosion-resistant metal, preferably nickel or a nickel/silver alloy, between which a semi-conductor layer 26 is sandwiched with a protective layer of electrically insulating material 27 applied over the exposed edges so that the semi-conductor layer 26 is encapsulated. The semi-conductor material is thus protected from chemical attack when the electrode is in its operating environment with an electrolyte such as KOH on the side of the current collector 21 and a gas supplied to the gas-side layer 22 via the backing 23. The outer sheet 24 of the current collector thus forms the operative gas-evolving face of the bifunctional electrode. If desired, to reduce energy requirements during charging of the battery, sheet 24 can be coated with an electrocatalytic gas-evolution coating such as one or more platinum-group metal oxides, mixed platinum-group metal oxide valve metal oxides, or other mixed oxides such as spinels and perovskites. Also, if desired, the surface of sheet 25 facing the gas-side layer can be coated with silver or another coating which reduces corrosion contact between the current collector and the carbon of layer 22.

The outer sheet 24 is connected to a metal electrode of a battery via an external charger or a load and thus effectively acts as current collector whereas the rear sheet 25 simply acts as a backing and to conduct current into or out of the gas-side layer during discharge of the battery.

As before, the semi-conducting layer 26 acts as a rectifier to prevent the flow of current into or out of layer 22 during charging of the battery thereby preventing unwanted gas evolution therein. The layer 26 may be formed of any of the aforementioned semi-conducting materials. The rectifying effect may be produced either by making the layer 26 form a p-n junction diode, or by making the layer 26 of p or n-type semi-conducting material which forms a Schottky barrier junction with one of the metal sheets 24 or 25 and an ohmic contact with the other one. In the case of a p-n junction, the layer 26 should have a low contact resistance with the nickel or other sheets 24, 25 and this can be ensured by vapour deposition of a thin metal layer on the semi-conductor prior to lamination of the sandwich assembly. A Schottky barrier junction can conveniently be formed with two nickel sheets 24, 25 in contact with an n-doped layer having one surface heavily doped n+, a rectifying Schottky junction being formed at the interface of the n-doped region and one nickel sheet, and a non-rectifying ohmic contact being formed at the interface of the n+doped region and other nickel sheet.

We claim:

1. A composite bifunctional porous gas-diffusion electrode operative alternately for gas consumption and gas evolution, comprising a gas-side layer operative for gas consumption, an electrolyte-side layer operative for gas evolution and current-collection means associated with the electrolyte-side layer, characterized in that it comprises an intermediate rectifying layer of semi-conducting material between the gas-side layer and the electrolyte-side layer.

2. The bifunctional electrode of claim 1, wherein the rectifying layer of semi-conducting material is a p-n junction diode.

3. The bifunctional electrode of claim 2, wherein the gas-side layer is operative for gas reduction, and the layer of semi-conducting material has a p-type conduction zone facing the gas-side layer and an n-type conduction zone facing the electrolyte-side layer.

4. The bifunctional electrode of claim 2, wherein the gas-side layer is operative for gas oxidation, and the layer of semi-conducting material has an n-type conduction zone facing the gas-side layer and a p-type conduction zone facing the electrolyte-side layer.

5. The bifunctional electrode of claim 1, wherein the layer of semi-conducting material contacts a layer of metal to form a Schottky barrier junction.

6. The bifunctional electrode of claim 1, wherein the layer of semi-conducting material is porous and electrolyte-permeable.

7. The bifunctional electrode of claim 1, wherein the current-collection means is a foraminate metal current collector of sandwich construction in which the layer of semi-conducting material is encapsulated.

8. The bifunctional electrode of claim 7, wherein the layer of semi-conducting material is sandwiched between two foraminate sheets of nickel.

9. The bifunctional electrode of claim 1, wherein the gas-side layer comprises a hydrophobic body having a hydrophilic part in contact with the layer of semi-conducting material.

10. The bifunctional electrode of claim 9, wherein the gas-side layer comprises carbon, hydrophobic material and a catalyst.

11. A secondary metal-gas battery comprising a metal electrode, a porous gas-diffusion bifunctional electrode having a gas-side layer operative during discharge for gas consumption, an electrolyte-side layer operative during charging for gas evolution and current-collection means associated with the electrolyte-side layer, electrolyte between the metal electrode and the electrolyte-side of the bifunctional electrode, and means for supplying gas to the gas-side layer of the bifunctional electrode, characterized in that the bifunctional electrode comprises an intermediate rectifying layer of semiconducting material between the gas-side layer and the electrolyte-side layer.

* * * * *